(No Model.) 2 Sheets—Sheet 2.
J. C. SCHUMAN.
MANUFACTURE OF STARCH.
No. 316,405. Patented Apr. 21, 1885.
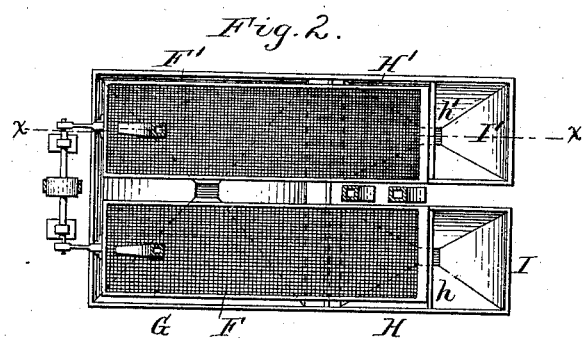
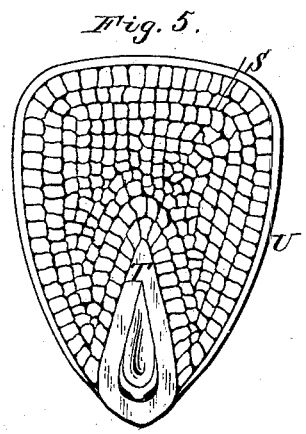
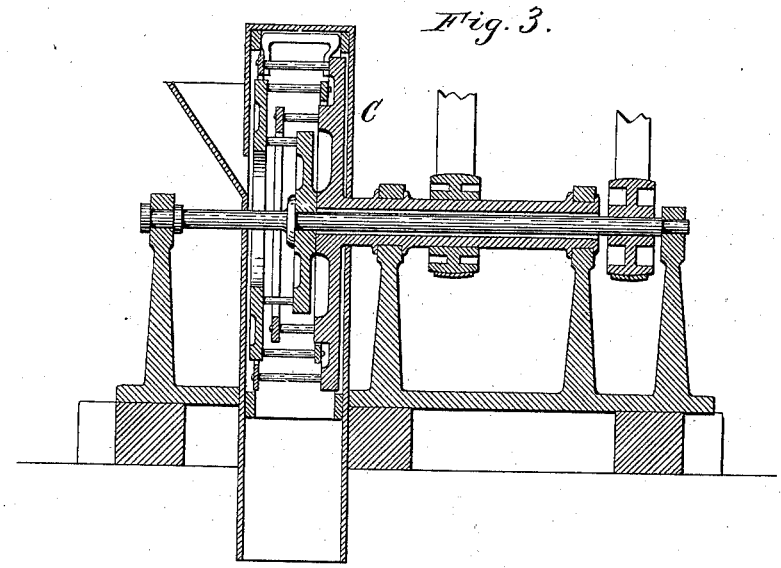
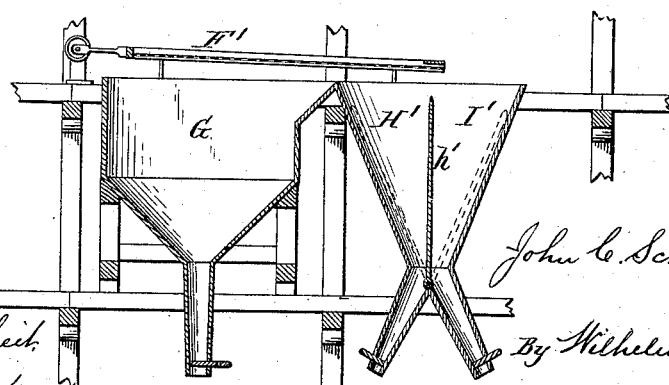

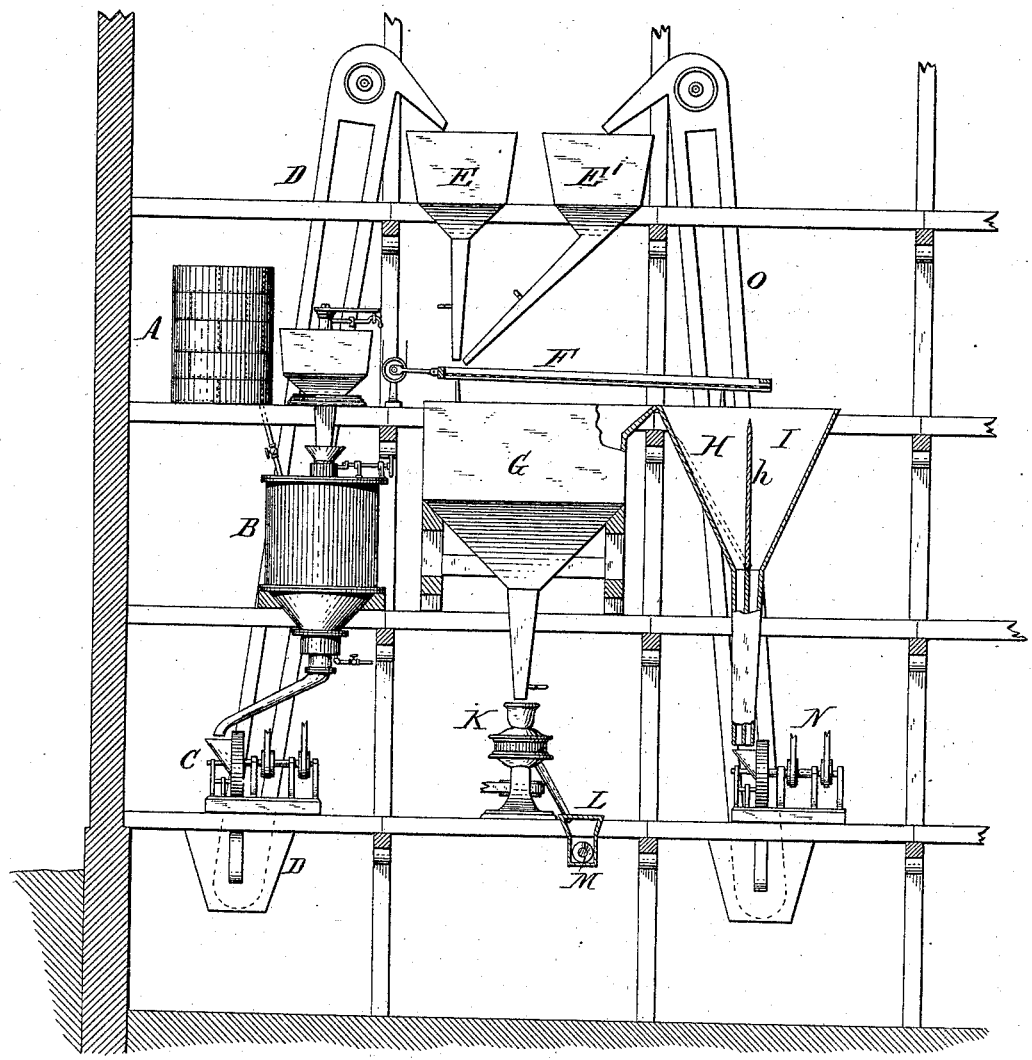

UNITED STATES PATENT OFFICE.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 316,405, dated April 21, 1885.

Application filed March 23, 1885. (No specimens.)

*To all whom it may concern:*

Be it known that I, JOHN C. SCHUMAN, of Akron, in the county of Erie, in the State of New York, have invented a new and useful Improvement in the Manufacture of Starch, of which the following is a specification.

This invention relates to an improved method of producing a starch-meal from Indian corn or maize in a simple and economical manner, which starch-meal is substantially free from impurities and suitable for the production of distilled spirits and for various other uses in the industrial arts.

A kernel of Indian corn or maize consists of three principal parts—viz., the inner portion or body, which consists, principally, of starch-cells; the outer inclosing skin or husk and its glutinous lining, which consists of wood fiber and nitrogenous compounds, albumen, and oil, which are useful for cattle-feed, and the germ or chit, which is located at the small or cob end of the kernel, and is very rich in oil, the latter constituting about seventy per cent. of its component parts.

In extracting the crude starch from Indian corn, wet processes have heretofore been generally employed. The oldest process of this kind is the so-called "sour" or "fermentation" process, in which the glutinous and oily matters are eliminated from the ground corn by fermentation. This process is very slow, requires large receptacles for the fermenting material, large quantities of water for washing the starch, and is very offensive, while yielding a comparatively low percentage of starch. This process produces what has been termed "sour starch"—that is, starch which contains germs of fermentation and which is liable to undergo destructive changes in any subsequent treatment for producing spirits or other products. Another more recent process which has been extensively used is the so-called "sweet" process, in which the starch is washed by water out of the ground grain, and the gluten and oily matters which accompany the starch are eliminated by caustic alkali. This process, like the first-mentioned one, requires large quantities of water and capacious receptacles for settling the starch out of the water in which it is suspended. The starch produced by this process is liable to contain traces of alkali after neutralizing it, while a large portion of the offal is charged with alkali, and thereby rendered unfit for use, the other portion of the offal being surcharged with moisture and thereby rendered unsalable, except for immediate consumption, which in many localities is far below the quantity of offal produced. In all these processes the gluten and oil become mixed with the starch in reducing the corn, and have to be eliminated either by fermentation or alkali and repeated washings, rendering the process expensive, slow, and wasteful, as a considerable portion of the starch is necessarily lost at each handling. It has also been attempted to separate the husks, gluten, and oily germs from the starch by dry treatment; but so far these attempts have been unsuccessful, because a large portion of these objectionable matters is unavoidably reduced to the same fineness as some of the starch, so that they cannot be separated from the starch by sifting, unless that portion of the starch which is reduced to the same fineness is sifted out with the offal, which reduces the yield of starch so low that the process is not profitable.

The object of this invention is to avoid these difficulties and produce in a simple and expeditious manner a starch-meal which is free from husks, gluten, and germs; and my invention consists to that end of the improved method of producing a starch-meal, which will be hereinafter fully described, and pointed out in the claims.

In the accompanying drawings, consisting of two sheets, Figure 1 is a longitudinal sectional elevation of a plant of machinery by which my invention is practiced. Fig. 2 is a top plan view of the separating-sieves. Fig. 3 is a sectional elevation of the reducing-machine. Fig. 4 is a vertical section in line $x\,x$, Fig. 2. Fig. 5 is a sectional view of a kernel of corn on an enlarged scale.

Like letters of reference refer to like parts in the several figures.

In practicing my invention I first steep the corn in a suitable tank or vat at a temperature of about 140° Fahrenheit, for about fifteen hours, whereby the kernels become expanded or swelled. This temperature is maintained in the steep by renewing the water from time to time. When the corn has been steeped, it will be found that the starchy body S of each kernel has become enlarged, pulpy, and soft; that the germ T has become similarly enlarged and tends to separate itself, by reason of its oily character, from the surrounding portions of the starchy body, which has become saturated with water, and that the husk or skin U has become tough and tends to separate with its glutinous lining from the starchy body and the oily germ. In steeping the corn care is taken that the temperature does not rise to 155° Fahrenheit, at which temperature the sacks of the starch-cells begin to burst and discharge their contents, which will then adhere to the skins and germs and render the subsequent separation of the parts difficult, if not impossible. In order to facilitate this separation, cold water is introduced into the steep vat or tank after the operation of steeping is completed, whereby the corn is chilled, and the skin or husks are still further toughened and the oily germs further loosened from the surrounding portions of the starchy bodies. The steeped corn, after having been thoroughly drained, is next subjected to the action of a reducing-machine consisting of several concentric rows of beaters or whippers revolving at a high speed in opposite directions within an inclosing-case. In this machine the steeped corn is whipped or beaten, whereby the husks or skins are opened and stripped in large flakes from the inner starchy bodies and from the germs, the starchy bodies being at the same time reduced to fine granules, while the germs are detached from the starchy portions and skins without being broken. The steeped kernels are in this manner reduced into three distinct products—viz., the finely-granulated starchy portions, the germs, which are considerably larger than these granules, and the still larger flakes of skins or husks and their glutinous linings. It will be observed that the corn is reduced in the moist pulpy condition in which it comes from the steep and that no water is added in the reducing-machine. In order to facilitate the discharge of the reduced material from this machine, the outer row of beaters is provided with one or more scrapers, which prevent the material from adhering to the inner side of the inclosing-case of the machine. The reduced material is next sifted, so as to separate the fine starchy portions of the skins and germs. This is effected by a suitable vibrating or rolling screen, which is preferably clothed for about two-thirds of its length from its head with fine wire-cloth, which permits the starch-granules to pass through, while it retains the germs and husks, and for the remainder of its length with coarse wire-cloth, which permits the germs to pass through, while the husks escape over the tail of the screen. The starch-granules, which have been so freed from the germs or chits and husks or skins, constitute the meal, which is now further treated in accordance with the ultimate product which is desired to be manufactured. The reduced material, as it comes from the reducing-machine, still contains some of the moisture which it has absorbed in the steep, and the meal and other products of the separation are moist to that extent; but the quantity of moisture contained in the meal, germs, and husks after these parts have been separated is insignificant, and can be easily removed by drying, if desired.

If it is desired to use the meal for the manufacture of distilled spirits, the meal may be mashed, the mash fermented, and the beer distilled in substantially the same manner which is now practiced; but by using this improved meal, instead of the whole grain, the following important advantages are gained:

The liberation of fusel-oil and other deleterious substances, which results mainly from the presence of the germs and husks in the mashed, fermented, or distilled material, is avoided, and the spirits produced are free from such substances. During the process of mashing, the material under treatment consists of a meal composed of granules of uniform size or fineness, whereby the development of the starch proceeds uniformly, and produces a uniform product, not containing lumps or aggregations of partly-developed starch to any considerable extent. During the process of fermenting the absence of coarse husks or skins equalizes and facilitates the action of the ferment upon the material under treatment, and avoids great changes of temperature during fermentation, thereby permitting the temperature of the fermenting material to be kept very closely to the maximum point without danger of acetic acid being formed, thus increasing the yield. During the process of distillation the absence of the coarse husks or solid material enables the alcohol to pass over into the worm more readily, thereby permitting the distillation to be carried on less violently or at a lower temperature, whereby the liability of the alcohol carrying impurities with it is correspondingly reduced. The absence of the coarse husks avoids the loss of alcohol by the husks absorbing a portion of the same and conveying it into the slops. Furthermore, the husks tend to adhere to the sides of the still and conduit-pipes, retard the action of the steam in the still, and necessitate the employment of more steam and power to move the material than is required in this process, in which the bulk of the material to be treated is greatly reduced, whereby the size and capacity of the apparatus can be correspondingly reduced. The spirits produced are of better quality, and will be fit for consumption in less time than heretofore. The husks and germs, being but slightly moist, can be kept a considerable length of time without souring, and, if not required for immediate consumption, can be dried at small expense and stored or shipped. The husks and germs form a desirable food for cattle, horses, pigs, and other animals, and may be mixed for that purpose; or the germs may be pressed to extract the oil, which is suitable for many uses, and the oil-cakes may be used as feed. The loss and inconvenience often attending the production of large unsalable quantities of slops are thereby avoided.

In the accompanying drawings, A represents a water-tank in which the hot steep-water is contained.

B represents the tank or vat in which the corn is steeped, and which is supplied with water from the tank A, and constructed with a perforated false bottom for draining.

C represents the reducing-machine, which receives the steeped grain from the tank B, and in which the grain is whipped or beaten, as above described. The reduced material is discharged from the machine into the foot of an elevator, D.

E represents a receiving-hopper, into which the reduced material is discharged from the head of the elevator D, and from which the material is fed upon the head of the separating-screen F.

G represents a receiver which collects the meal which passes through the upper finely-clothed portion of the screen F.

H represents a receiver which collects the germs or chits passing through the lower coarsely-clothed portion of the screen, and I is a receiver which collects the husks or skins which escape over the tail of the screen.

The receivers H and I are separated by a movable partition, h, which can be placed vertically, as shown in full lines in Fig. 1, when it is desired to collect the germs separately, and which can be inclined, as shown in dotted lines, when it is desired to mix the germs with the tailings.

K represents a reducing-mill which receives the meal from the receiver G and in which the meal is further reduced to a higher degree of fineness. The mill preferably employed for this purpose is known as the "Bogardus" mill, and consists, essentially, of two serrated or grooved disks having a slight eccentric movement with reference to each other, whereby the gumming or clogging of the disks by the meal is avoided.

L is a receiver which receives the ground meal from the mill K, and M is a conveyer whereby the ground meal is conducted to a final receiver or to any other apparatus in which the meal is further treated.

N is a supplementary reducing-machine, constructed like the machine C, in which the steeped grain is reduced, and receiving the husks and germs, either or both, from the hoppers H and I, for the purpose of detaching from these products of the separation any starch particles which may adhere to the same, if such further treatment is necessary or desirable. The reduced material coming from the machine N is conducted by an elevator, O, into a hopper, E', from which it is spouted upon a separating-screen, F', which is arranged on one side of the screen F, and which effects a separation of the detached meal from the germs and skins, the meal passing into the receiver G and the germs and skins into receivers H' and I'. The receivers H' and I' are also separated by a movable partition, h', so that the germs and husks can be directed into the receivers H' and I' and both products be commingled or collected separately, as may be preferred.

It is obvious that the arrangement of the parts of the apparatus may be modified in accordance with the space at disposal, and the general form or character of the building in which it is placed.

I claim as my invention—

1. The herein-described method of manufacturing a starch-meal from Indian corn or maize, consisting in first steeping the corn, whereby the starchy portions and the germs are swelled and the skins are toughened, then detaching the skins and germs from the starchy portions by whipping or beating without water, and then separating the skins and germs from the meal by sifting, substantially as set forth.

2. The herein-described method of preparing Indian corn for the separation of the skins and germs from the starchy portions, which consists in steeping the corn in warm water until the starchy portions and germs are expanded or swelled and then chilling the corn by cold water, whereby the separation of the skins and germs from the starchy portions is facilitated, substantially as set forth.

Witness my hand this 21st day of March, 1885.

JOHN C. SCHUMAN.

Witnesses:
S. B. GOODALE,
JOHN T. ABBOTT.